July 18, 1944.   D. H. DUFFY ET AL   2,353,954
JIG FOR ASSEMBLING COMPONENTS OF SUB-STRUCTURES
Filed June 25, 1942   2 Sheets-Sheet 1

D. H. DUFFY
J. W. WILEY
M. M. ROSS
INVENTORS.

BY U. G. Charles, Atty.

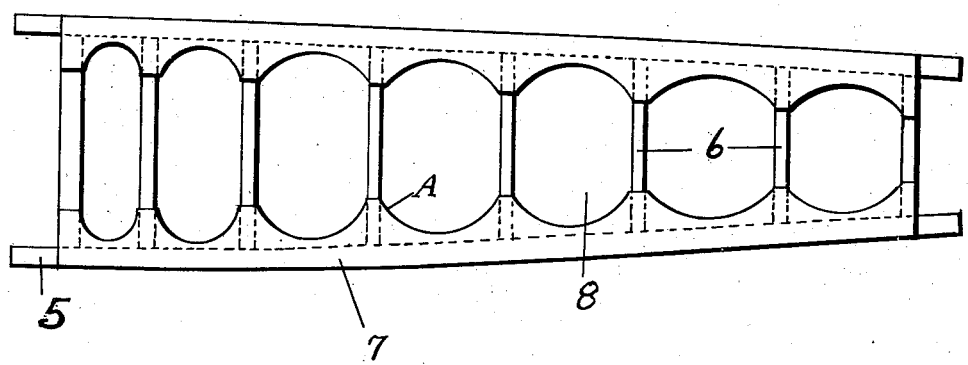
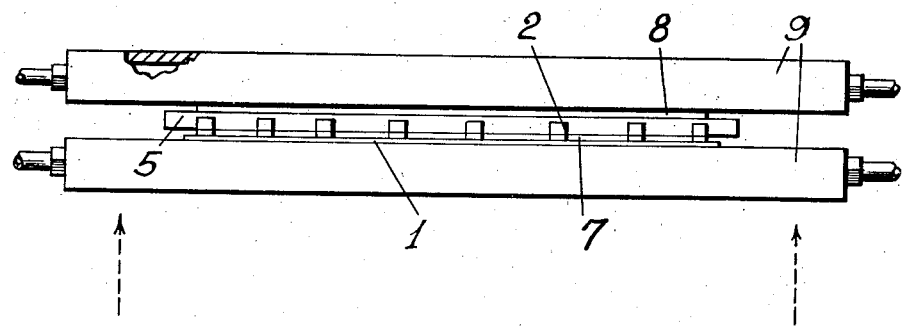
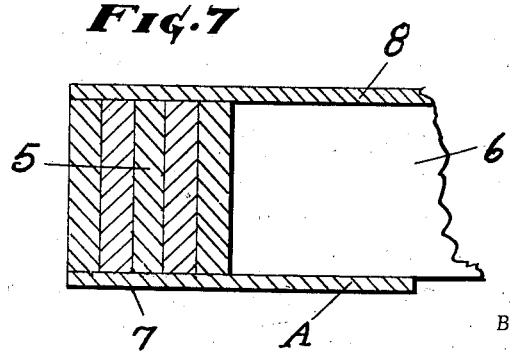
D. H. DUFFY
J. W. WILEY
M. M. ROSS
INVENTORS.

Patented July 18, 1944

2,353,954

UNITED STATES PATENT OFFICE

2,353,954

JIG FOR ASSEMBLING COMPONENTS OF SUBSTRUCTURES

David H. Duffy, James W. Wiley, and Milburn M. Ross, Wichita, Kans., assignors to Beech Aircraft Corporation, Wichita, Kans., a corporation of Delaware Application June 25, 1942, Serial No. 448,450

2 Claims. (Cl. 144—288)

Our invention relates to a process and method of assembly of non-metallic fabricated components of airplane wing ribs or other frame structures, and has for its principal object a jig in which to accurately form and speed-up the assembly of a substructure by applying glue to its components and placing the same in the jig, and heating means to cause quick setting of the glue, the glue setting time being reduced from a normal period of hours down to a period from four to six minutes.

A further object of our invention is to provide a jig comprising a metallic plate having a plurality of shoulders secured thereto and outwardly extending from one side of the plate to retain the members of a rib structure accurately positioned for duplication of the rib, and furthermore to support the rib during the process of setting the glue which is accomplished by a hot press introducing heat to both jig and rib simultaneously, whereby the jig and rib are pressed during the short time required to harden the glue, after which, the rib structure is removed and the jig ready to receive the components of another rib.

These and other objects will hereinafter be more fully explained, reference being had to the accompanying drawings forming a part of this specification, and wherein like characters will apply to like parts in the different views.

Referring to the drawings:

Fig. 5 is an opposite side view of the wing rib from that shown in Fig. 2.

Fig. 6 is an edge view of the heating platens and a wing section therebetween, the upper platen partly in section.

Fig. 7 is a cross sectional view through the cord.

Figure 1:
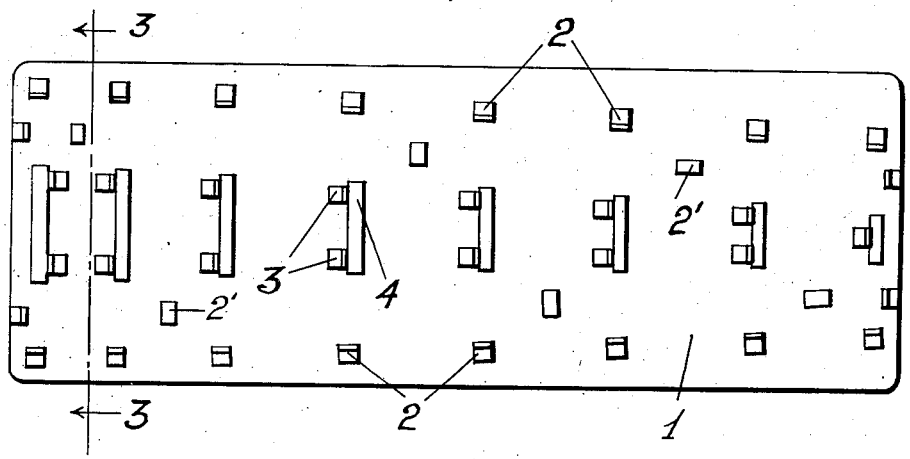
Fig. 1 is a plan view of the jig, with respect to its shoulders.
Figure 2:
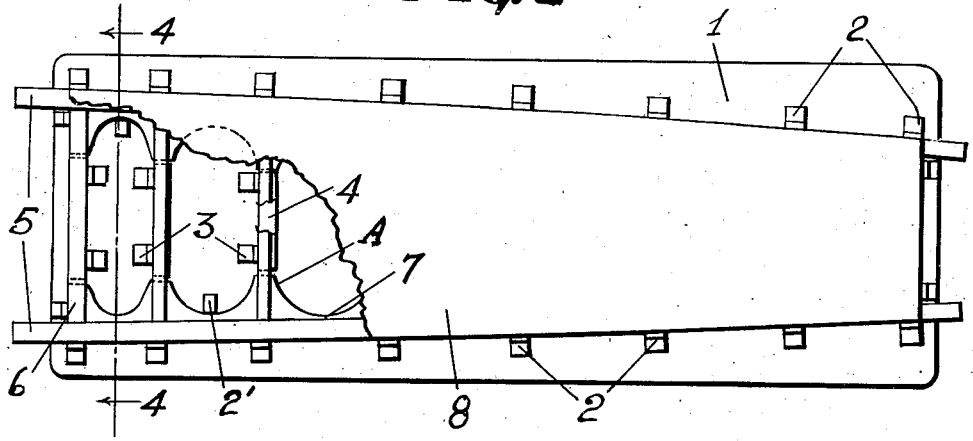
Fig. 2 is a plan view showing the position of an airplane wing rib seated on the jig, omitting the trailing and leading edges, and other parts removed for convenience of illustration.
Figure 3:
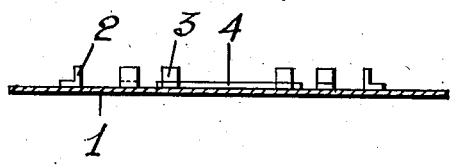
Fig. 3 is a sectional view taken on line 3—3 in Fig. 1.
Figure 4:
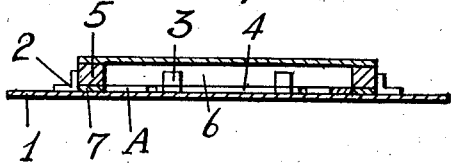
Fig. 4 is a sectional view taken on line 4—4 in Fig. 2.

To accomplish the result of the above said objects a metallic jig is required consisting of a metallic plate 1, having rigidly positioned in spaced relation near two of its oppositely disposed edges a plurality of shoulders 2, each of which is secured to the plate by welding and extending from the same side thereof at right angles thereto, the shoulders along each edge of the jig being positioned on an arc and opposite to and in spaced relation to the shoulders on the opposite edge of said jig, the arcs outwardly extending from each other and being on different radius substantially as shown, and against which the members of a cord are assembled as later described.

Secured to the side of the plate on which the shoulders are placed is a plurality of pairs of shoulders 3 in spaced relation longitudinally of the plate intermediate the rows of shoulders, each pair of shoulders 3 positioned adjacent one edge of a bar 4, one portion of each pair of shoulders 3 being at right angle to the plate to form an abutment for a strut member later described, said strut member seating on said bar as spacing means for said strut from the plate. Inwardly of each row of shoulders and spaced laterally therefrom is a row of spaced metallic stops 2' to resist an inward deflection of a gusset member while the glue between adjacent elements of the structure to be formed in the jig is setting. The jig above described is means in which to place the assembly of the component parts of a wing rib of an airplane whereby the rib is formed and glued together as later described.

The jig thus described is an element for the first step and being the apparatus together with a heating system further required to complete the process.

For example, we have introduced a wood structure for an aircraft wing rib consisting of upper and lower cords 5, solid strut members 6, a thin gusset plate 7 to cover one side of each cord, and a web 8 to cover the other side of the entire rib structure, each gusset plate 7 having extensions inward of the rib to seat on the sides of their respective end portions of the struts to function as gussets A. In the assembly of the wing rib, the gusset plates 7 are the first elements placed on the jig plate 1, each gusset plate to engage the inner sides of its respective group of shoulders 2 of the jig plate, the gussets A extending inward toward bars 4. On each gusset plate is placed a cord to contact its respective shoulders 2, after which strut members 6 are placed on the bars 4 between the cords, forcing the cords tightly against their respective shoulders 2, and then over the above described assembly the solid plate 8 is placed, but the peripheral edge of said plate will not contact any part of the jig. The faying sides of all said members and including the end engagement of all of the struts has liquid glue applied thereto and assembled as follows. The gusset plate 7 of each cord has a film of glue applied to one side and placed between shoulders 2 and 2' with its film of glue upward and on which is placed the cord which consists of a plurality of plies transversely assembled with respect to the grain and having a film of glue applied between the plies that are vertically disposed and being retained arcuately by their engagement against shoulders 2 and being clamped thereto by end engagement of the strut members 6, the latter having a film of glue on each end thereof. On the cords and strut members is placed a web 8 having glue applied to its side confronting the cords and strut members, the contour of said web coinciding with the arc of the cords, after which the jig and rib thus assembled are subjected to heat by placing the same between two hollow platens 9 that are heated to a high degree of temperature, steam preferred, said platens being mounted in a suitable press to move vertically and each being moved to snug engagement with the jig and rib for a time period of from four to six minutes to set and harden the glue, after which the rib assembly is removed for a repeated process.

It will be seen in Fig. 7 that the components of a cord consist of a plurality of wood plies alternately assembled transverse to the grain of the wood to strengthen the longitudinal extending grain transversely, the cords being thus assembled is a mechanical turn to bend the cord and retain the same thus formed when the glue is hardened.

While we have shown a certain number of plies, the same is subject to alteration as the number of plies may vary, and such other modification may be made as lies within the scope of the appended claims.

Having fully described the invention what is believed as new and desired to secure by Letters Patent is:

1. In a jig of the class described comprising a plate of a suitable length and width, a plurality of rows of spaced elements attached to one side of the plate and arranged along arcs longitudinally thereof, and a plurality of spaced members arranged longitudinally of the plate and intermediate the rows of first said elements, all but one of said members being arranged in pairs and a plurality of bars extending transversely of said rows of elements, each bar except one being positioned in abutting relation with a pair of said spaced members and the said one bar being in abutting relation to said one member, all as and for the purpose specified.

2. In a jig of the class described, a plate of a suitable thickness, length and width, a plurality of abutment elements secured to one side of the plate and outwardly extending therefrom, said abutment elements being arranged in two pair of arcuate rows, the pairs being oppositely disposed on the plate so that the concavity of the pairs will confront each other and a plurality of members arranged in pairs, said pairs of members being spaced apart longitudinally of the plate and arranged between the pairs of rows of the abutment elements substantially as shown.

DAVID H. DUFFY.
JAMES W. WILEY.
MILBURN M. ROSS.